Figure 4:
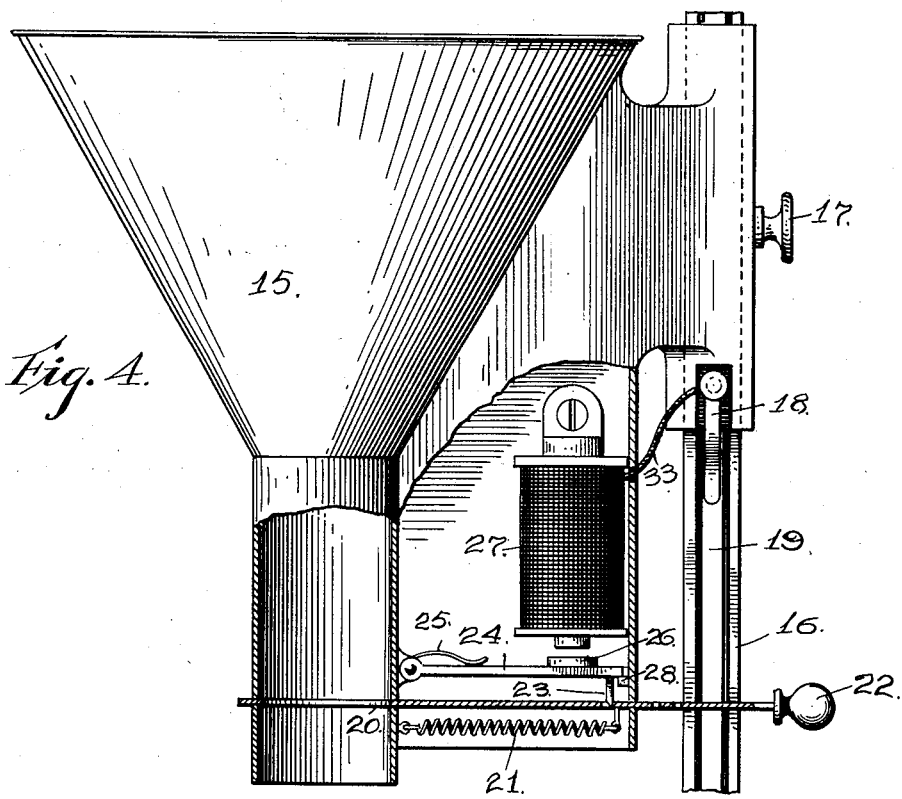

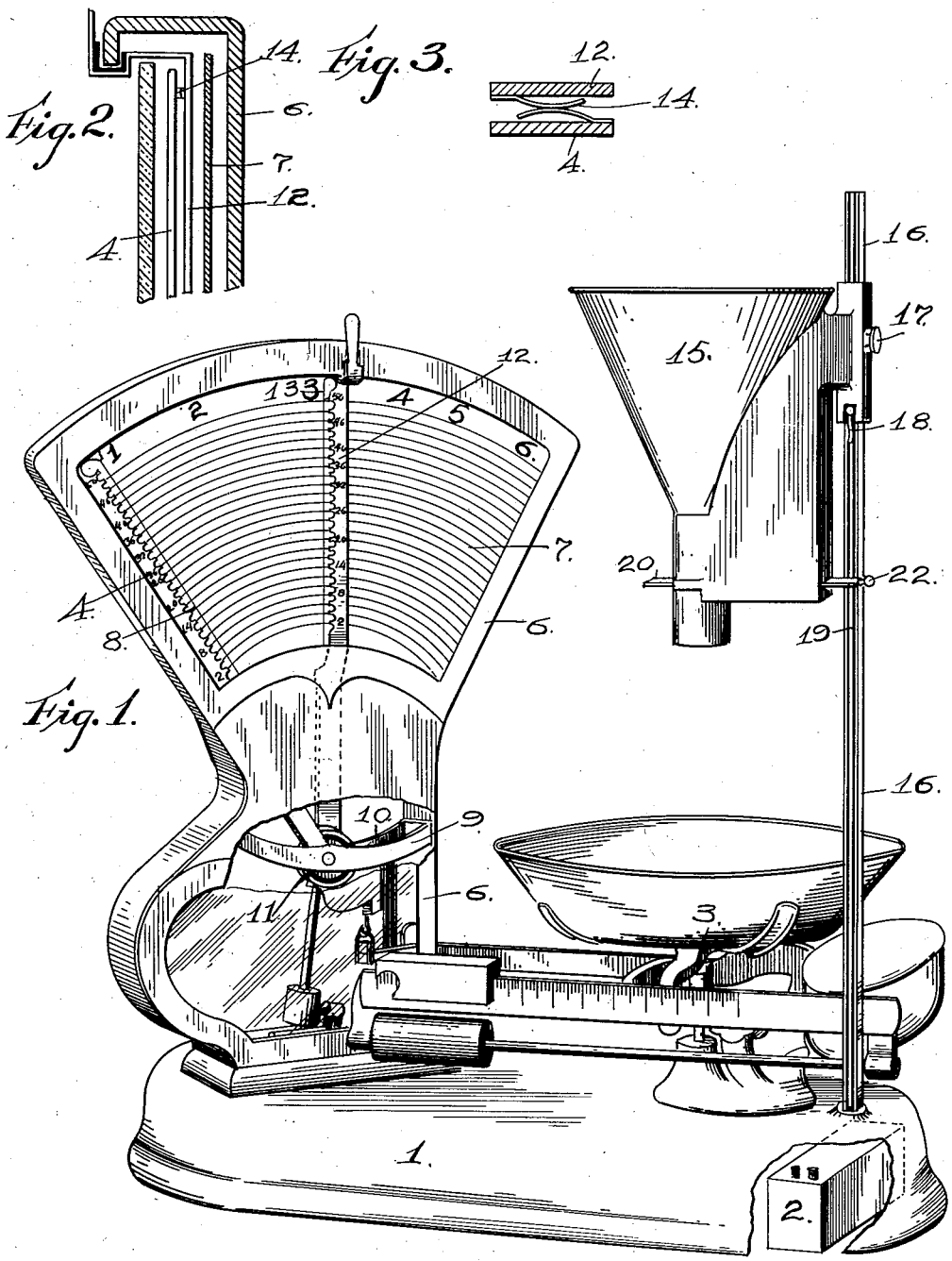

J. J. DUFFIE.
COMPUTING SCALE CUT-OFF.
APPLICATION FILED JUNE 5, 1909.

1,057,811.

Patented Apr. 1, 1913.

5 SHEETS—SHEET 2.

Witnesses.
Arthur L. See.
Ronald C. Griffin.

Inventor.
John J. Duffie.
Carlos P. Griffin
Attorney

J. J. DUFFIE.
COMPUTING SCALE CUT-OFF.
APPLICATION FILED JUNE 5, 1909.

1,057,811.

Patented Apr. 1, 1913.
5 SHEETS—SHEET 4.

Witnesses.
Arthur L. Slee.
Ronald C. Griffin.

Inventor:
John J. Duffie.
Carlos P. Griffin
Attorney

J. J. DUFFIE.
COMPUTING SCALE CUT-OFF.
APPLICATION FILED JUNE 5, 1909.

1,057,811.

Patented Apr. 1, 1913.
5 SHEETS—SHEET 5.

Witnesses.
Arthur L. Slee.
Ronald C. Griffin.

Inventor.
John J. Duffie.
Carlos P. Griffin
Attorney

UNITED STATES PATENT OFFICE.

JOHN J. DUFFIE, OF SAN FRANCISCO, CALIFORNIA.

COMPUTING-SCALE CUT-OFF.

1,057,811.  Specification of Letters Patent.  Patented Apr. 1, 1913.

Application filed June 5, 1909. Serial No. 500,424.

*To all whom it may concern:*

Be it known that I, JOHN J. DUFFIE, a citizen of the United States, residing at San Francisco, in the county of San Francisco and State of California, have invented a new and useful Computing-Scale Cut-Off, of which the following is a specification in such full and clear terms as will enable those skilled in the art to construct and use the same.

This invention relates to a cut off for scales, the object of which is to provide a device which will automatically cut off the flow of material into the weighing receptacle when the precise quantity desired has passed into the same.

Heretofore it has been common to place a receptacle, as a paper bag, on a scale pan or platform and fill the bag slowly by pouring the material into the same, the attendant at the same time watches the scale hand or moving chart to see that he does not place too large a quantity of material in the receptacle but since the hand or chart moves slowly at times and then rapidly, or vice versa, it almost always happens that too large an amount of material is placed in the receptacle. The excess must then be removed, and the attendant then repeats the filling of the receptacle more slowly than before, and after several approximations is able to place the desired amount therein.

This invention seeks to provide means whereby any desired computed amount of material may be placed in a scoop or receptacle on the scale pan or platform in a single operation with remarkable rapidity and precision. The error is so small that it is not necessary to remove any of the material from the receptacle. It will be apparent that the error may be reduced to as small an amount as may be desired for any given material, but since the specific gravities of various materials are different, slight differences may result where a considerable number of materials are handled, but this possible difference is sought to be made as small as possible by an adjustment of the feeding hopper with respect to the scale receptacle, whereby the amount of material falling and not actually in process of being weighed is accurately accounted for and is reduced to the minimum.

A further object of the invention is to produce a device of this character which is applicable to a computing scale of either the stationary chart type or to the movable drum type of scale.

Figure 5:
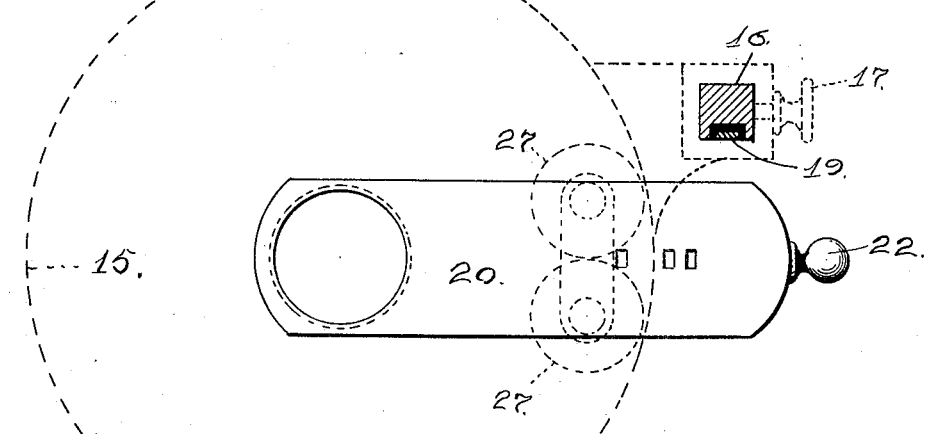
Figure 6:
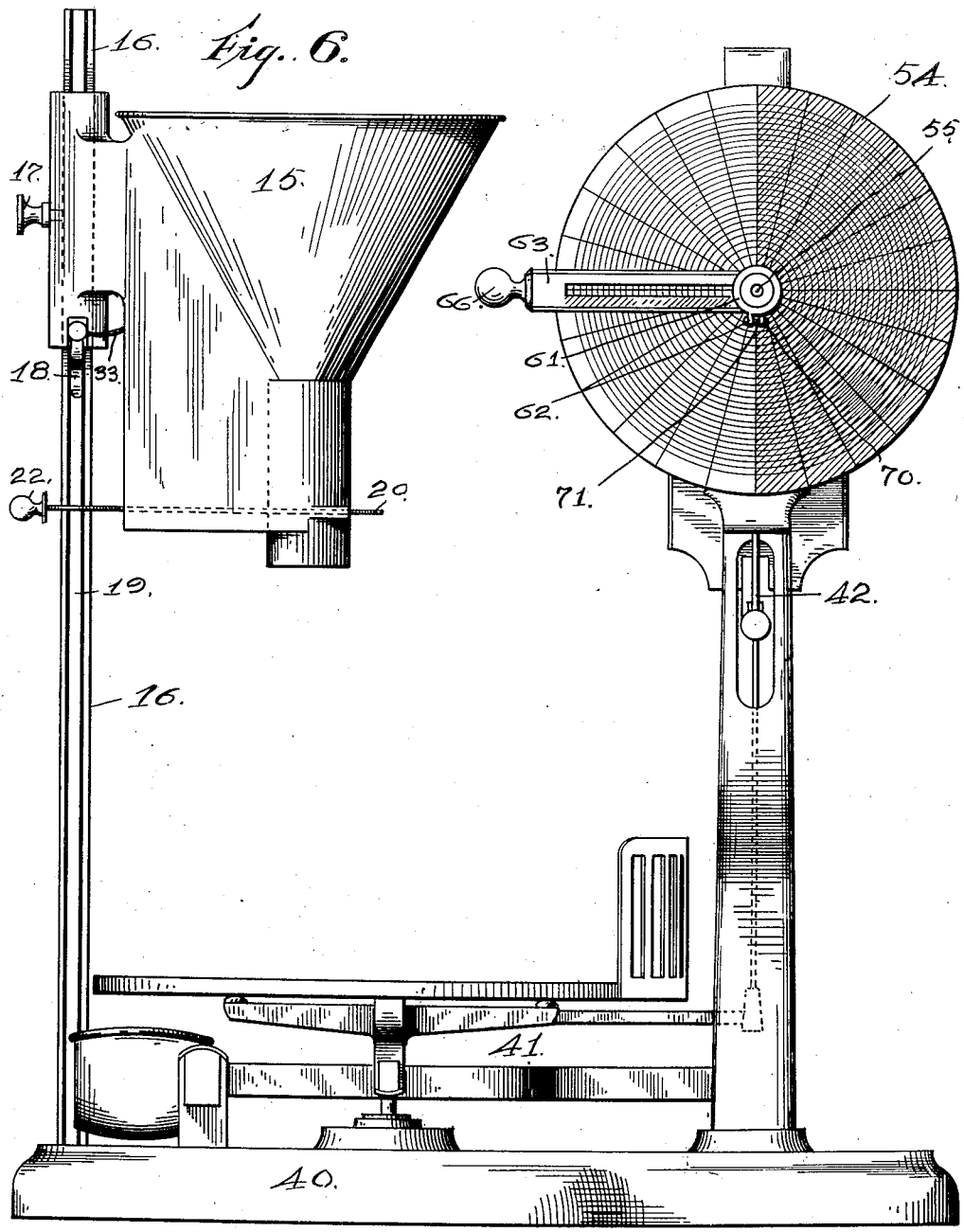
Figure 7:
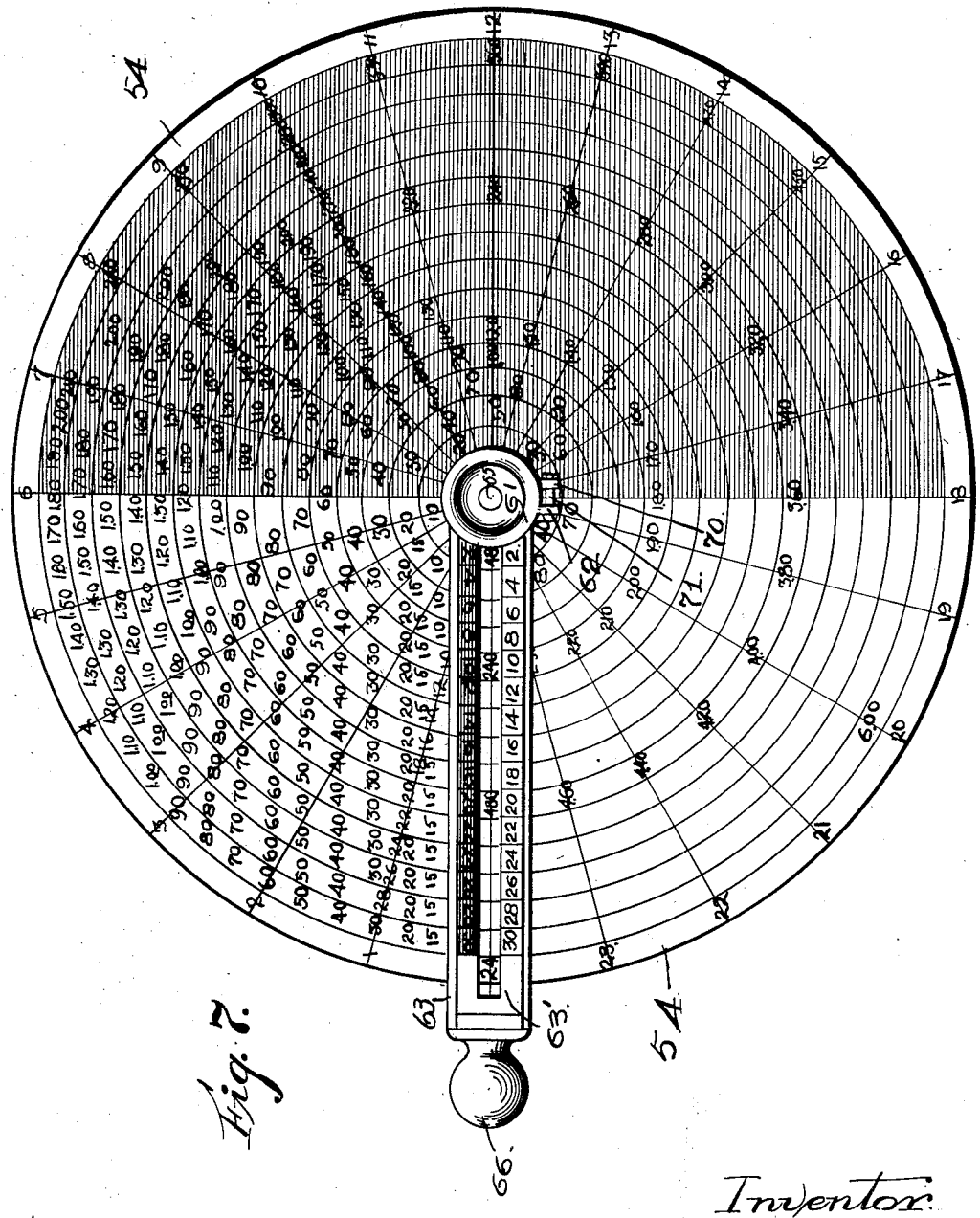
Figure 8:
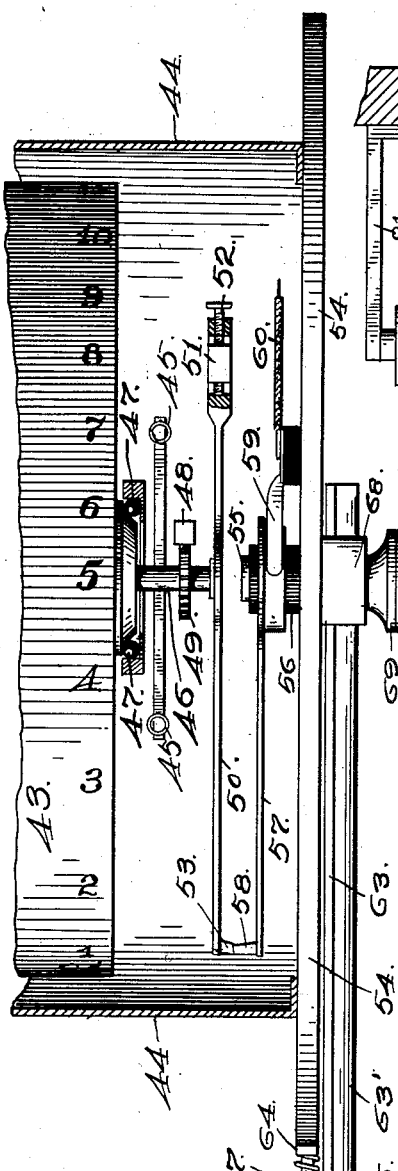
Figure 10:
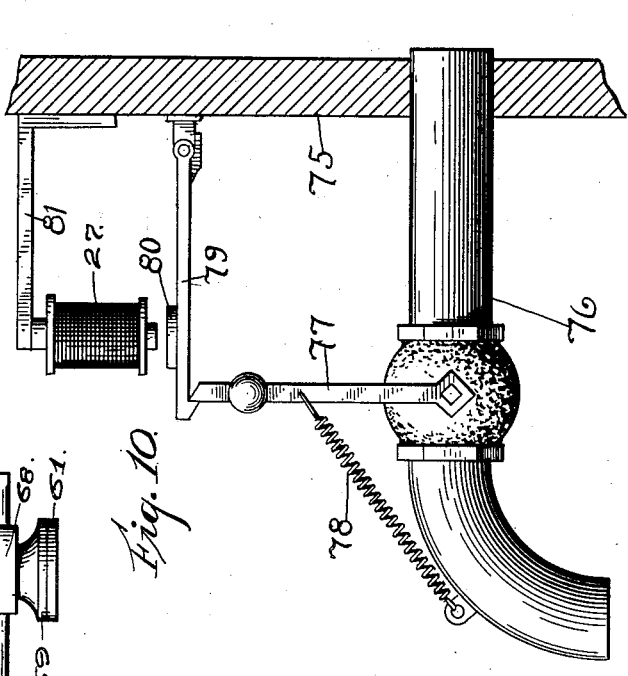
Figure 9:
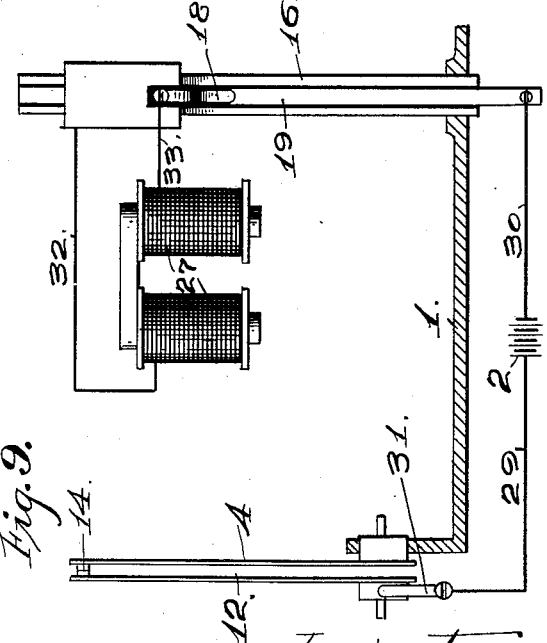

In the drawings, in which the same numeral of reference is applied to the same portion throughout the several views, Figure 1 is a perspective view of a computing scale of the fixed chart type having the invention applied thereto, Fig. 2 is a sectional view at the top of the chart case showing the manner of moving the cut off hand, Fig. 3 is a sectional view of the scale hand and the cut off hand showing the electrical contact points, Fig. 4 is a side elevation partly in section of the feeding hopper and a portion of the standard supporting it, Fig. 5 is a plan view of the cut off slide, the positions of the hopper, the magnets and the supporting post also being indicated, Fig. 6 is a side elevation of a drum type scale having the cut off applied thereto, Fig. 7 is a side elevation of the chart used with the drum machine, Fig. 8 is a view, partly in section of the portion of the end of the drum and case therefor, and showing the cut off chart as secured to the drumcase, Fig. 9 is a diagram of the electrical wiring for both forms of scales, and Fig. 10 is side elevation of a cut off for use with liquids.

The numeral "1" represents the base of the scale which is of the usual form, and in this instance is high enough to cover an electric battery "2". The scale is provided with the common form of weighing apparatus "3" which operates an arm "4" in a case "6", said arm passing in front of a chart "7", said chart having a number of figures thereon which are for the purpose of giving the price of any quantity of material at a wide range of prices per pound. The arm "4" is provided with a fine wire "8" for the purpose of determining the precise point at which the scale pan is loaded with a given amount of material. This arm may also be provided with a series of characters for the purpose of carrying the price per pound along with it in order that the attendant need not be liable to make a mistake in carrying said price per pound from one side of the chart to the other.

The scale just described is of a common form and is no part of this present invention.

The scale arm "4" is supported in any suitable manner between a pair of plates "9" and "10", and also secured to said plates "10" is an insulating block "11"

which supports a movable hand "12" upon which are located a series of figures giving the price per pound similar to the hand or arm "4" except that it is arranged so that its hair line "13" is on the left instead of on the right as with the arm "4". The object of having the two arms face each other is to provide for the visibility at all times of all the figures of the chart over which the hand "12" is to move. This hand "12" moves about the same center as the arm "4" and has a handle which passes out of the case and into reach of the attendant as shown in Fig. 2. The arm "4" and the hand "12" are each provided with very light spring contact points "14", said springs being so arranged that they will touch each other, but will not materially interfere with the operation of the scale regardless of whether the cut off is used or not.

The materials to be weighed are placed in a hopper "15" which is adjustable on a post "16" with respect to the scale pan, the object of the adjustment being to reduce the quantity of material which is in the air and not being weighed to the smallest possible amount, as for example, should a large quantity of material be desired it might fill a large bag which would bring the top of the mass of material within a short distance of the bottom of the funnel spout, while should a small quantity of material be desired the funnel would be so high that it might be that the entire desired amount would be in the air from the funnel to the scale pan. This objection is overcome by having the funnel adjustable, since with a small amount of material the hopper would be placed quite close to the scale pan or platform.

The hopper is secured in any position on the post "16" by means of a set screw "17" or other suitable adjustable means and it is also provided with a spring contact point "18" which is always in contact with bar "19" three sides of which are insulated in a groove in the post "16". The hopper is provided with a sliding gate "20" which is held in the closed position by means of a spring "21"; a knob "22" being provided to pull the gate out. The gate is held in the open position by means of a latch "23" on a pivoted arm "24", said arm being pressed downwardly by means of a light spring "25". An armature "26" is provided at the end of the arm "24" in order that the magnets "27" may pull the pivoted arm and its latch away from the sliding gate when they have been energized. A stop "28" is provided for the arm "24" to rest on when its latch has dropped down into one of the holes in the sliding gate, and in order that the gate may be opened a small amount, or the full amount, as may be desired the gate has several holes therein. The object of having this gate adjustable is to provide for the weighing of heavy and light materials, as for example, should the hopper be full of rice it would run out very quickly and would be liable to overweigh should the gate be opened to its full extent, but with a light material, as rolled oats, the gate should be open to its full extent since the quantity of material in the air would be so small in weight as to be negligible.

The wiring diagram is shown in Fig. 9, and comprises the battery "2" the wires "29" and "30" leading therefrom, the spring contact "31" bearing on the boss of the insulated hand "12", the scale arm "4", the base "1" of the scale, the post "16", the wires "32" and "33" leading to the magnets "27" and the insulated strip "19" which is connected with the wire "30".

In operation the hand "12" is set at any desired point, as determined by an inspection of the chart and the hair line on the hand, the hopper gate is then pulled back any desired amount and the material is poured into the hopper. The scale hand "4" will at once begin to travel across the chart, and as soon as its contact point reaches the contact point on the arm, or hand "12" the magnets will be energized and the slide will snap closed cutting off the supply of material from the scale pan or platform. Should the same material be again desired it will only be necessary to place another receptacle on the scale pan and open the slide, but if another material is to be weighed, the hopper is first emptied and then is ready for weighing any other desired material.

The second form of the invention is intended for use with computing scales of the drum type, as illustrated in Fig. 6. It is to be noted that in the form of invention first described that the scale chart is itself available for use with the computing hand of the scale and the cut off hand, since the entire chart is in full view of the attendant, but with the drum type of machine all the computed quantities are on the inside of the drum and can be seen only at one place through an opening in the casing surrounding the drum, all of this being well known in the art. It, therefore, becomes necessary to provide an additional chart for use with the cut off hand in order that the attendant may be able to see all the quantities he may desire to set the cutoff hand opposite. The numeral "40" represents the base of a machine of the drum type, "41" representing the weighing apparatus which may be of any desired type, a draw bar "42" being secured to said weighing apparatus for the purpose or rotating the cylindrical drum "43" in the case "44," springs "45"

returning the draw bar to its initial position when the load has been removed from the scale pan or platform. The drum is supported by means of a shaft "46" and ball bearings "47," said ball bearings being for the purpose of reducing the friction of the shaft "46". The drum is rotated by means of a bar "48" which acts in conjunction with a small pinion "49" on the shaft of the drum "43", said bar being secured to the drawbar "42". The shaft "46" is provided with a hand "50" at its outer end, said hand having a balancing weight "51" moved by means of a screw "52", and at the opposite end it has a contact point "53" the same as the contact points on the cutoff and scale hands in the other form of the invention. On the end of the casing "44" there is secured a chart "54" which has the same number of divisions radially as the face of the drum, that is if the drum is intended to weigh twenty-four pounds, note Fig. 8, the chart, note Fig. 7, is also divided into twenty-four parts. The chart is then numbered at its outer edge with the pounds, and the interior of the chart is divided into substantially the same number of concentric circles as the number of price per pound divisions on the drum. These circles have the same number of divisions as there are computation values on the face of the scale. The chart shown begins with 2 and runs by even numbers to 30, and in the annulus formed by the circles on each side of each of said numbers there is a series of figures which are the computed amounts of the particular number of pounds on the margin of the chart multiplied by the price per pound as given in any one annulus. For example, on the outer edge of the chart near the top will be found the number 5 while just under it will be found the mark 1.50, said mark being in the annulus at the price 30 cents per pound. As many additional radial lines may be provided as may be required to mark the pennies or the smallest coin used. It is also to be noted that since the figures cover considerable area it is necessary to determine the precise point at which the weight at the given price per pound will equal the desired amount by means of a radial line through the given figure, as for example, on the chart illustrated only the full radial lines have been shown, but it will be seen that on the lower part of the chart that the radial lines pass through the number 3.60 at the center of the 6, while at the number 4.60 the line passes through the three figures. The reason for the change in position of the figures with respect to the position of the radial lines is in order that the attendant may be able to properly read all the figures on the chart without changing his position. It will also be noted that the figures on one side of the chart have been shaded while those on the other side have not. The object of this is to call attention to the numbers on the cutoff indicator hand which correspond in color or shading with said figures and are to be read in connection therewith as will be later explained. The chart is rigidly secured to the end of the cylinder case "44" the position being fixed to correspond with the position of the drum "43" when no load is in the scale pan. Passing through the chart "54" and the end of the drum casing "44" is a small shaft "55" having an insulating bushing "56" on its inner end, said bushing carrying a hand "57" having a contact point "58" the same as the contact "53". Said hand has a boss currounding the insulating bushing on which presses a spring contact "59"; said contact being secured on the inside of the chart "54," and being connected with a wire "60", leading from the battery. The outer end of the shaft "55" is secured to a dish "61", said disk having a depending ear "62". The indicator cutoff hand "63" is supported near the end of the shaft "55" which projects through the chart, said hand being equipped with a common form of magnifying glass "63", and having a pressure foot "64" on the end of a rod "65", said rod being secured to the knob "66", and being held in contact with the outer edge of the chart by means of the spring "67". The object of this foot is to hold the arm in any desired radial position. The inner end of the hand or arm is provided with a strap "68" to which is secured the disk "69", said disk having a depending lug "70". Passed through the lug "70" and the ear "62" is a screw "71", the object of said screw being to provide means for the adjustment of the contact hand with respect to the indicator hand, since it may be possible that with use the place of contact of the drum hand and the contact point of the indicator hand might be changed when it would be necessary to provide some means to adjust the place of contact. The indicator "63" is provided with a hair line at its longitudinal center, and on each side thereof is provided with oppositely placed sets of figures, the object being to carry around the price per pound and to make possible the easy reading of said price when the hand has moved over the top of the chart, the light figures being read when on one side and the dark figures being read when on the other side of the chart, the corresponding light and dark figures of the chart and hand being read together. The cutoff hopper used with this form of the invention is precisely the same as the cutoff used with the other form of the invention, and the wiring diagram is the same so that it is not necessary to repeat the description thereof. The operation of this machine is similar to that of the other form except that the attendant reads the figures he desires to use on the chart at the end of the computing drum and sets the hand "63" at the desired place. When the proper load has been placed on the scale pan the contact points will come together and the magnets will be energized and the slide will be closed as before.

It is to be noted that in each form of the invention that the scale may be used at will even without using the automatic cutoff for the reason that the only connection between the cutoff indicator hands and the weighing apparatus is the very light contact point spring on the cutoff indicator hand, and said spring is so constructed as to permit the movement past it in either direction of the drum hand, or the scale hand in the first form of the invention.

It will be clear that the cutoff apparatus described above, may be used for any character of solids, but where a liquid is to be weighed, it is necessary to use a slightly different form of cutoff valve. Such a valve is illustrated in Fig. 10. In this figure, the numeral "75" represents the wall of a flu'd containing vessel, into which the spigot "76" is inserted, said spigot being of a common form and having a valve operating handle "77", said handle being drawn into the closed position by means of a spring "78". The handle is held in the open position by means of a latch "79", said latch being pivoted on the wall of the receptacle "75". This latch carries an armature "80", which is drawn upwardly by means of the magnets "27", said magnets being the same as those used in the other construction and supported by means of an arm "81" which is secured to the receptacle "75". The electrical connections in this case are precisely the same as for the other constructions, and the manner of operation is the same.

Having thus described my invention what I claim as new and desire to secure by Letters Patent of the United States is as follows, modifications within the scope of the appended claims being reserved:—

1. In a scale, the combination of a weighing apparatus, a feeding hopper therefor, a gate for said hopper, means to hold said gate normally closed, a latch adapted to hold said gate open, an electro-magnet adapted to open said latch when energized, a fixed chart having a series of weight and price computations thereon, a hand adapted to be manually moved in front of said chart and carrying a series of price per pound figures, another hand operated by the weighing apparatus, electrical circuits connected with the magnets and electrical connections with the two hands whereby the magnet will release the gate latch when energized; substantially as set forth.

2. In a scale, the combination of a weighing apparatus, a feeder therefor, a post to support said feeder, means to secure said feeder in a number of different levels on said post, an insulated electrical conductor carried by said post, a gate for said feeder, means to hold said gate normally closed, means to hold the gate open when necessary, a chart having a series of weight and price computations thereon, a hand manually movable in front of said chart and having price per pound figures thereon, another hand operated by the weighing apparatus, electro-magnets adapted to release the gate-holding means, and electrical connections between the hands, the conductor on said post and the electro-magnets whereby the latter will be energized and the gate released when the contacts touch, as set forth.

3. In a scale cut-off, the combination of a weighing apparatus, a feeder therefor, a gate for said feeder, a spring to close the gate, a movable hand for indicating a series of quantities, a chart having a series of quantities indicated on its face and in front of which the movable hand is placed, a scale chart correlated with the weighing mechanism for indicating the weight of material on the weighing apparatus, a latch to hold said gate open, electro-magnets to release said latch, and an electrical circuit adapted to be closed by said scale chart and movable hand for energizing the electro-magnets to release the gate latch to permit the latter to close, as set forth.

4. In a scale cut-off, a weighing apparatus, a feeding device, a cut-off gate for said feeding device, a spring to close said cut-off gate, a movable chart for indicating the weight of material, a fixed chart having a series of figures thereon, a hand adapted to move over the said fixed chart, and means operated by the movable chart and said hand for closing the feed gate when the desired amount of material has been placed on the weighing apparatus, substantially as described.

5. In a scale cut-off, a weighing apparatus, a feeding device, an automatic cut-off for said device, a latch to hold said cut-off open, an electro-magnet for releasing said cut-off and permitting the same to close, a fixed chart having a series of weight and price computations thereon, a hand manually movable in front of said chart, and having a series of price per pound figures thereon, a friction stop carried by said hand and adapted to hold said hand in a number of positions, an electrical circuit connected with said magnet, and means operated by the weighing apparatus to close the circuit when the desired weight of material has been placed on the weighing apparatus.

6. In a scale cut-off, a weighing apparatus, a feeding device, an automatic cut-off for said feeding device, a magnet to release said cut-off to permit the same to close, a circular chart having a series of weight and price computations on the face thereof, a hand manually movable in front of said chart, and having a series of price per pound figures thereon, a friction stop carried by said hand and bearing on the edge of said chart to hold the hand in any desired position, an electrical circuit connected with said magnet and a contact point operated by the weighing apparatus to close the electrical circuit and release the cut-off to enable the same to close when the contact point and hand substantially coincide in position, substantially as described.

In testimony whereof I have set my hand this 26th day of May A. D. 1909, in the presence of the two subscribed witnesses.

JOHN J. DUFFIE.

Witnesses:
C. P. GRIFFIN,
G. MAGNER.